United States Patent [19]

Korchynsky et al.

[11] E Re. 28,790

[45] Reissued Apr. 27, 1976

[54] HIGH-STRENGTH LOW-ALLOY STEELS HAVING IMPROVED FORMABILITY

[75] Inventors: Michael Korchynsky; John David Grozier; John L. Mihelich, all of Bethel Park, Pa.

[73] Assignee: Jones & Laughlin Steel Corporation, Pittsburgh, Pa.

[22] Filed: Nov. 11, 1974

[21] Appl. No.: 522,524

Related U.S. Patent Documents

Reissue of:

[64] Patent No.: 3,666,570
Issued: May 30, 1972
Appl. No.: 842,407
Filed: July 16, 1969

[52] U.S. Cl. ..... 148/36; 75/123 B; 75/123 E; 75/123 H; 75/123 N; 75/123 J; 148/12 F; 148/12.3

[51] Int. Cl.[2] ..... C22C 38/04

[58] Field of Search ..... 148/36, 12 R, 12 F, 148/12.1, 12.3; 75/123 B, 123 E, 123 H, 123 N, 123 J, 123 L, 124

[56] References Cited

UNITED STATES PATENTS

| | | | |
|---|---|---|---|
| 2,360,717 | 10/1944 | Phelps | 75/53 |
| 2,683,662 | 7/1954 | Tisdale et al. | 75/123 E |
| 3,102,831 | 9/1963 | Tisdale | 148/12 |
| 3,333,987 | 8/1967 | Schrader et al. | 148/12.1 |
| 3,375,105 | 3/1968 | Lynch | 75/123 J |

OTHER PUBLICATIONS

Lichy et al., Control of Sulfide Shape in Low Carbon Al-Killed Steel, Journal of Metals, July 1965, pp. 769–775.

*Primary Examiner*—R. Dean
*Attorney, Agent, or Firm*—Buell, Blenko, & Ziesenheim

[57] ABSTRACT

Fully killed high-strength low-alloy steels consisting essentially of .06% to .20% carbon, .50% to 1.4% manganese, .01% to .08% columbium or .04% to .12% vanadium, .05% maximum silicon, .04% maximum sulfur, .04% maximum phosphorus and an inclusion shape-control agent comprising either .06% to .20% zirconium, 0.1% to .10% of a rare earth or .01% to .10% mischmetal are characterized in a hot-rolled finished condition by yield strengths in excess of 45,000 p.s.i., ultimate tensile strengths in excess of 60,000 p.s.i., ductilities as measured by percent elongation (2 inches) in excess of 20%, good toughness, superior formability and reduced directionality. The steels are hot-rolled finished in the temperature range 1550° F. to 1650° F., cooled at a rate within the range 20° F. to 135° F. per second and collected by coiling or piling within a temperature range of 1025° F. to 1175° F.

9 Claims, 10 Drawing Figures

HIGH-STRENGTH LOW-ALLOY STEELS HAVING IMPROVED FORMABILITY

Matter enclosed in heavy brackets [ ] appears in the original patent but forms no part of this reissue specification; matter printed in italics indicates the additions made by reissue.

*This application is an application for reissue of our Patent No. 3,666,570 issued May 30, 1972.*

This invention relates to high-strength low-alloy steels characterized by a desirable balance and uniformity of physical properties and distinguished by their formability and reduced directionality.

We have developed a class of high-strength low-alloy steels which in a hot-rolled finished condition exhibit good toughness, ductility and strength. In addition, the steels are of superior formability and reduced directionality, that is, the longitudinal (parallel to the rolling direction) and transverse (across the rolling direction) properties of the steels, with respect to notch toughness and ductility, are more nearly the same. The improved formability and reduced directionality are brought about through the use of an inclusion shape-control agent comprising either zirconium, a rare earth, or mischmetal which, of course, is a mixture of rare earths. The use of an inclusion shape-control agent results in the formation of substantially spherically-shaped inclusions which retain their spherical shape in the finished material. This inclusion morphology results in a reduction of the directionality of the steels by improving their resistance to ductile fracture in the transverse direction and by making their longitudinal and transverse ductilities more nearly alike. In addition, the formability of the steels is improved.

The steels of the invention employ either vanadium or columbium as a strengthening agent and are processed within definite finishing and collecting temperature ranges to produce desired properties in the steel directly off the hot-mill.

Accordingly, an object of the present invention is to provide low-alloy steels having high strength in combination with good toughness and ductility, superior formability and reduced directionality. Another object of the invention is to provide such steels characterized in a hot-rolled finished condition by yield strengths in excess of 45,000 p.s.i., ultimate tensile strengths in excess of 60,000 p.s.i., ductilities as measured by percent elongation (2 inches) in excess of 20% and good toughness. Still another object of the invention is to provide such steels having improved resistance to ductile fracture in the transverse direction.

Figure 1:
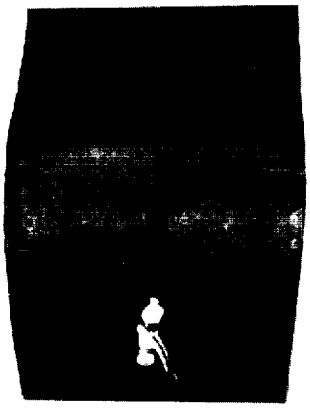
Figure 2:
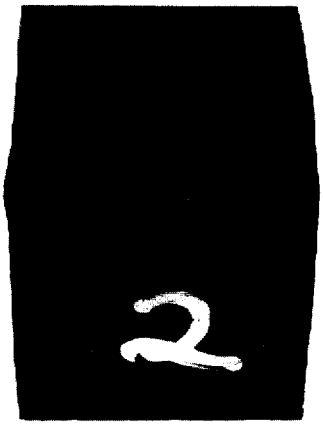
Figure 3:
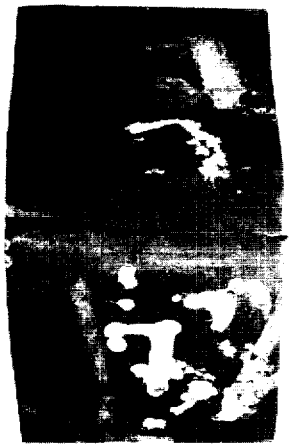
Figure 4:
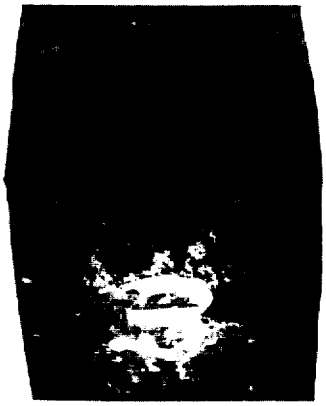
Figure 5:
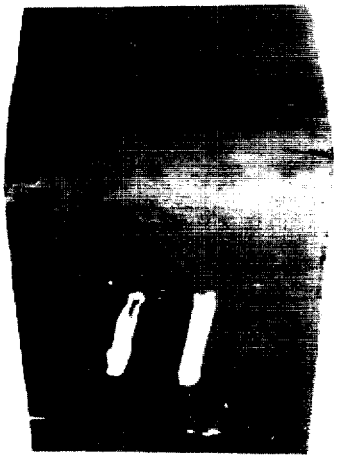
Figure 6:
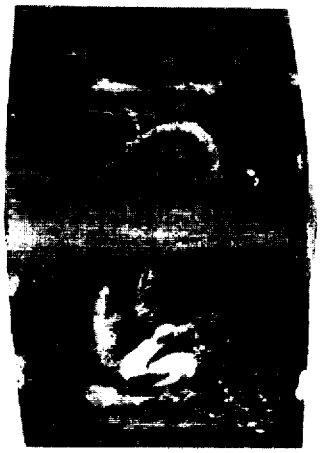
Figure 7:
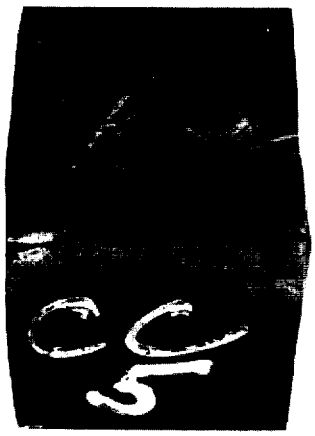
Figure 8:
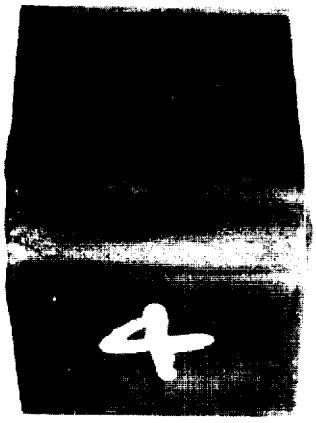
Figure 9:
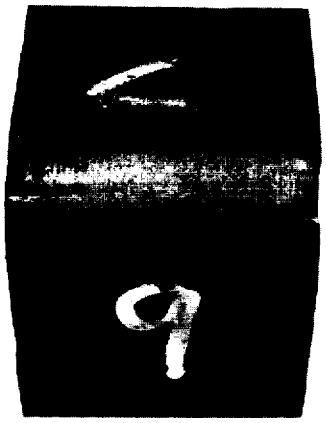
Figure 10:
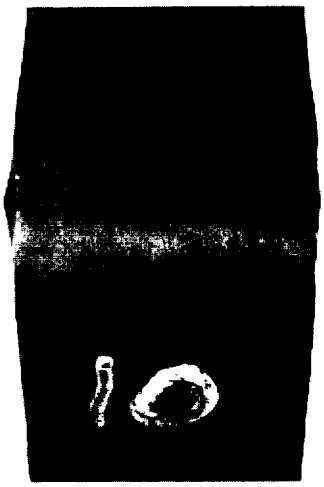

These and other objects and advantages of the present invention will become apparent from the following detailed description thereof with reference to the drawings wherein FIGS. 1 through 10 are photographic reproductions of steel specimens which have been subjected to bending tests and illustrate the improved formability of the steels of the invention.

The steels of the present invention are fully killed and have the following general chemistry: carbon, .06% to .20%; manganese, .50% to 1.4%; columbium, .01% to .08% or vanadium, .04% to .12%; silicon, .5% maximum; sulfur, .04% maximum; phosphorus, .04% maximum; an inclusion shape-control agent comprising either .06% to .02% zirconium, .01% to .10% of a rare earth, or .01% to .10% mischmetal; and balance iron.

The preferred steels of the invention consists essentially of .10% to .15% carbon, .9% to 1.2% manganese, .02% to .04% columbium or .04% to .07% vanadium, .05% maximum silicon, .025% maximum sulfur, .03% maximum phosphorus, .08% to .12% zirconium or .01% to .10% of a rear earth or mischmetal, balance iron. Rare earths which are employed in the steels of the invention are, for example, cerium, lanthanum, praseodymium, neodymium, yttrium and scandium.

The steels to possess the desired characteristics and properties of a yield strength in excess of 45,000 p.s.i., an ultimate tensile strength in excess of 60,000 p.s.i., ductility as measured by percent elongation (2 inches) in excess of 20% and a superior toughness are hot-rolled finished in the temperature range of 1550° F. to 1650° F. and collected by coiling or pilling within a temperature range of 1025° F. to 1175° F. For the typical length of a modern hot-mill run-out table and conventional rolling speeds, the steel must be cooled at a rate within a range of 20° F. to 135° F. per second to maintain finishing and coiling temperatures within these ranges. Steels finished and/or collected at temperatures in excess of the temperatures set out above generally exhibit strengths below a yield strength of 45,000 p.s.i. and an ultimate tensile strength of 60,000 p.s.i. In addition, the steels do not have as good impact properties as steels hot rolled within the temperature ranges set out above. Steels finished or coiled below the desired temperature ranges exhibit ductilities as measured by percent elongation inferior to the ductilities of steels of the invention. In addition, low finishing temperatures result in production liabilities in that rolling speeds must be slower to achieve the lower finishing temperatures.

As noted above, the inclusion shape-control agents cause the sulfide inclusions in the steel to retain a spherical form, resulting in a significant improvement in the formability of the material and reducing the directionality of the steels. In the absence of an inclusion shapecontrol agent, the inclusions become elongated during hot rolling and aligned parallel to the rolling direction and contribute to the differences in ductility and impact energy absorbed (100% ductile fracture) between longitudinal and transverse test sections of the steels.

Sufficient zirconium is added to the steels of the invention so that there is a minimum of .02% zirconium in the steel in excess of the zirconium which combines with the nitrogen in the steel to form nitrides. For a typical highstrength low-alloy steel containing .006% nitrogen, therefore, approximately a minimum of .06% zirconium is added to the steel. The minimum amount of zirconium required is given by the following formula: percent zirconium=0.02% zirconium+6.5 (wt. percent N). The zirconium is preferably added to the steel in the ingot mold during teeming. Zirconium additions are made when the mold is about one-third full and the additions completed by the time the mold is about two-thirds full. Typical zirconium recoveries achieved employing this method of addition are about 60%. The zirconium additions can also be made to the ladle after the heat is tapped. However, the steel in the ladle must be first fully killed to assure good zirconium recovery. In this technique, it is important to employ good teeming practice to minimize oxygen or nitrogen entrainment during teeming which adversely affects zirconium recovery.

The reduced directionality of the steels of the invention with respect to increased transverse impact shelf energies and more nearly alike transverse and longitudinal ductilities is shown in the table. All of the steels listed in the table were hot-rolled finished within 1550° F. to 1650° F. and collected within 1025° F. to 1175° F. While Steel 1 contained .01% zirconium it is considered to have not been treated with zirconium since that amount of zirconium is insufficient to bring about the desired inclusion morphology. The specimens for which the data of the table were obtained comprised one-half size Charpy V-notch samples, except for Steel 5 where one-third size samples were employed. The impact energies set out in the table are at 100% ductile fracture of the specimens.

nitrides does not occur. However, when rare earths or mischmetal are used as the inclusion shape control agent, additional carbon is not needed to maintain a given strength level.

We claim:

1. A [kill] *killed* high-strength low-alloy steel which has been hot-rolled finished in the temperature range 1550° F. to 1650° F., cooled at a rate within the range of 20° F. to 135° F. per second, and collected within a temperature range of 1025° F. to 1175° F., the steel being characterized in a hot rolled condition by a yield strength in excess of 45,000 p.s.i., an ultimate tensile strength in excess of 60,000 p.s.i., ductility as measured by percent elongation (2 inches) in excess of 20%, good toughness and formability and reduced directionality, said steel consisting essentially of .06% to .20% carbon, .50% to 1.4% manganese, a strengthening

TABLE

| Steel | Chemistry (wt. percent) C | Mn | Si | Al | V | Cb | Zr | N | Treatment | Test direction | Thickness (in.) | Yield strength (p.s.i.) | Ultimate tensile strength (p.s.i.) | Percent elongation (2") | Impact energy, ft.-lbs. |
|---|---|---|---|---|---|---|---|---|---|---|---|---|---|---|---|
| 1 | .10 | .90 | .052 | .075 | 0.47 | | .01 | .007 | None | Longitudinal | .250 | 55,700 | 71,300 | 30.5 | 70 |
| | | | | | | | | | | Transverse | .250 | 56,700 | 71,400 | 28.0 | 18 |
| 2 | .11 | 1.07 | .047 | .073 | .05 | | .10 | .007 | Zr | Longitudinal | .250 | 49,300 | 69,200 | 30.0 | 60 |
| | | | | | | | | | | Transverse | .250 | 50,300 | 68,800 | 31.0 | 40 |
| 3 | .12 | 1.07 | .27 | .008 | .034 | | | .007 | None | Longitudinal | .312 | 57,400 | 77,100 | 30.0 | |
| | | | | | | | | | | Transverse | .312 | 59,700 | 78,200 | 24.5 | 18 |
| 4 | .12 | 1.10 | .27 | .072 | .04 | | .091 | .007 | Zr | Longitudinal | .250 | 59,100 | 77,100 | 26.5 | 63 |
| | | | | | | | | | | Transverse | .250 | 61,400 | 78,200 | 230 | 40 |
| 5 | .13 | 1.04 | .27 | .065 | .033 | | | .007 | None | Longitudinal | .179 | 56,600 | 78,500 | 25.0 | 27 |
| | | | | | | | | | | Transverse | .179 | 60,700 | 78,200 | 23.5 | 9 |
| 6 | .11 | 1.11 | .24 | .073 | .041 | | .104 | .000 | Zr | Longitudinal | .312 | 59,300 | 79,000 | 25.0 | |
| | | | | | | | | | | Transverse | .312 | 67,100 | 80,700 | 24.0 | 29 |
| 7 | 16 | .83 | .037 | .005 | | .054 | | | None | Longitudinal | .312 | 67,400 | 83,700 | 28.5 | 41 |
| | | | | | | | | | | Transverse | .312 | 69,600 | 85,700 | 24.5 | 17 |
| 8 | .12 | .109 | .27 | .071 | .039 | | .087 | .007 | Zr | Longitudinally | .250 | 64,100 | 83,000 | 23.0 | |
| | | | | | | | | | | Transverse | .250 | 67,100 | 81,500 | 21.5 | 33 |
| 9 | .15 | 1.14 | .35 | .063 | .08 | | | | None | Longitudinally | .274 | 72,600 | 94,900 | 28.5 | 47 |
| | | | | | | | | | | Transverse | .274 | 72,100 | 92,200 | 24.0 | 19 |
| 10 | .14 | .90 | .021 | .061 | | .042 | .11 | .006 | Zr | Longitudinal | .250 | 74,000 | 86,700 | 24.5 | 40 |
| | | | | | | | | | | Transverse | .250 | 76,300 | 89,700 | 21.5 | 29 |

The improved formability of the steels of the invention is shown by FIGS. 1 through 10 of the drawings. Samples were sheared from Steels 1 through 10 of the table and subjected to a 90° bend. The inside bend radius for all specimens except the specimens of Steel 5 was .250 inch. The inside bend radius for the specimens of Steel 5 was .125 inch. FIGS. 1 through 10 represent specimens taken from Steels 1 through 10 of the table, respectively. As shown in the drawings, the steels which did not contain zirconium, FIGS. 1, 3, 5, 7 and 9, cracked upon bending. Of the specimens from the steels containing zirconium, FIGS. 2, 4, 6, 8 and 10, only specimens from Steels 6 and 8 exhibited cracking, but to a very minor degree and substantially less than the specimens of the steels having approximately the same chemistry but not containing zirconium.

Equivalent reduced directionality and improved formability is obtained using rare earths and mischmetal rather than zirconium as the inclusion shape-control agent. In this regard, we have found that in order to maintain a given strength level for the steels of the invention containing vanadium and employing zirconium as the inclusion shape control agent it is necessary to increase the carbon content of the steel. This is because the strength of the steel is derived from vanadium nitride precipitates and when zirconium is added the nitrogen preferentially combines with the zirconium and strengthening by the formation of vanadium agent selected from the group consisting of .01% to .08% columbium and .04% to .12% vanadium, .5% maximum silicon, suflur in an amount up to .04%, .04% maximum phosphorus, a sulfide inclusion shape-control agent selected from the group consisting of .06% to .20% zirconium, .01% to .10% of a rare earth and .01% to .10% mischmetal, balance iron, the sulfide inclusions in the steel having a substantially spherical shape, *said zirconium being present in a minimum of 0.02% zirconium +6.5 (wt. percent N).*

2. The steel of claim 1 wherein the strengthening agent comprises .01% to .08% columbium.

3. The steel of claim 1 wherein the strengthening agent comprises .04% to .12% vanadium and the sulfide inclusion shape-control agent comprises .01% to .10% of a rare earth.

4. A killed high-strength low-alloy steel which has been hot-rolled finished in the temperature range 1550° F. to 1650° F., cooled at a rate within the range of 20° F. to 135° F. per second and collected within a temperature range of 1025° F. to 1175° F. the steel being characterized in a hot rolled condition by a yield strength in excess of 45,000 p.s.i., an ultimate tensile strength in excess of 60,000 p.s.i., ductility as measured by percent elongation (2 inches) in excess of 20%, good toughness and formability and reduced directionality, said steel consisting essentially of .10% to .15% carbon, .9% to 1.2% manganese, a strengthening agent selected from the group consisting of .02% to .04% columbium and .04% to .07% vanadium, .05% maximum silicon, sulfur in an amount up to .025%, .03% maximum phosphorus, a sulfide inclusion shape-control agent selected from the group consisting of .08% to .12% zirconium, .01% to .10% of a rare earth and .01% to .10% mischmetal, balance iron, the sulfide inclusions in the steel having a substantially spherical shape, *said zirconium being present in a minimum of at least 0.02% zirconium +6.5 (wt. percent N).*

5. The steel of claim 4 wherein the strengthening agent comprises .02% to .04% columbium.

6. The steel of claim 5 wherein the sulfide inclusion shape-control agent comprises .08% to .12% zirconium.

7. The steel of claim 5 wherein the sulfide inclusion shape-control agent comprises .01% to .10% of a rare earth.

8. The steel of claim 4 wherein the strengthening agent comprises .04% to .07% vanadium.

9. The steel of claim 8 wherein the sulfide inclusion shape-control agent comprises .01% to .10% of a rare earth.

* * * * *

UNITED STATES PATENT OFFICE
CERTIFICATE OF CORRECTION

PATENT NO. : Re.28,790
DATED : April 27, 1976
INVENTOR(S) : Michael Korchynsky et al.

It is certified that error appears in the above-identified patent and that said Letters Patent are hereby corrected as shown below:

Column 2, line 42, "shapecontrol" should read --shape control--.

Column 2, line 53, "highstrength" should read --high-strength--.

In the TABLE, in Column 3, under the heading "N", for Steel 6, ".000" should read --.006--.

In the TABLE, in Column 4, under the heading "Test Direction", "Longitudinally" in both instances should read --Longitudinal--.

In the TABLE, in Column 4, under the heading "Percent elongation (2"), "230" should read --23.0--.

In the TABLE, in Column 4, under the heading "Percent elongation (2"), "21.5" second occurrence should read -- 24.5 --.

Signed and Sealed this
Twentieth Day of July 1976

[SEAL]

*Attest:*

RUTH C. MASON
*Attesting Officer*

C. MARSHALL DANN
*Commissioner of Patents and Trademarks*